United States Patent

[11] 3,628,559

[72] Inventor Mariani Branko
 663 W. 13th St., San Pedro, Calif. 90731
[21] Appl. No. 81,200
[22] Filed Oct. 16, 1970
[45] Patented Dec. 21, 1971

[54] ULLAGE OPENING SPILLAGE PREVENTION SYSTEM
 6 Claims, 3 Drawing Figs.
[52] U.S. Cl. .................................................. 137/202, 137/266
[51] Int. Cl. ..................................................... F16k 31/18
[50] Field of Search ........................................ 137/266, 265, 255, 344, 202; 4/26, 28, 131

[56] References Cited
 UNITED STATES PATENTS
 163,458  5/1875  Chabot ......................... 137/202
 785,594  3/1905  Crispin ......................... 137/202
 1,056,238  3/1913  Walter .......................... 137/202

Primary Examiner—M. Cary Nelson
Assistant Examiner—Robert J. Miller
Attorney—Fulwider, Patton, Rieber, Lee & Utecht ABSTRACT: A system for preventing spillage or overflow of liquid cargo through the ullage openings of cargo tanks of a tanker. An elongated guide is provided in the expansion trunk of each of the cargo tanks, the guide being characterized by an open framework which mounts a float for movement toward the ullage opening when the liquid cargo rises in the tank. The float is engageable with a seat adjacent the opening to seal off the opening and prevent cargo spillage occasioned by inadvertent overfilling. The open framework of the guide permits the ullage opening to still be used to insert a probing element into the cargo tank, the guide preferably being inclined from the vertical for this purpose. Conduits are also provided to convey overflow cargo to empty cargo spaces.

PATENTED DEC 21 1971 3,628,559
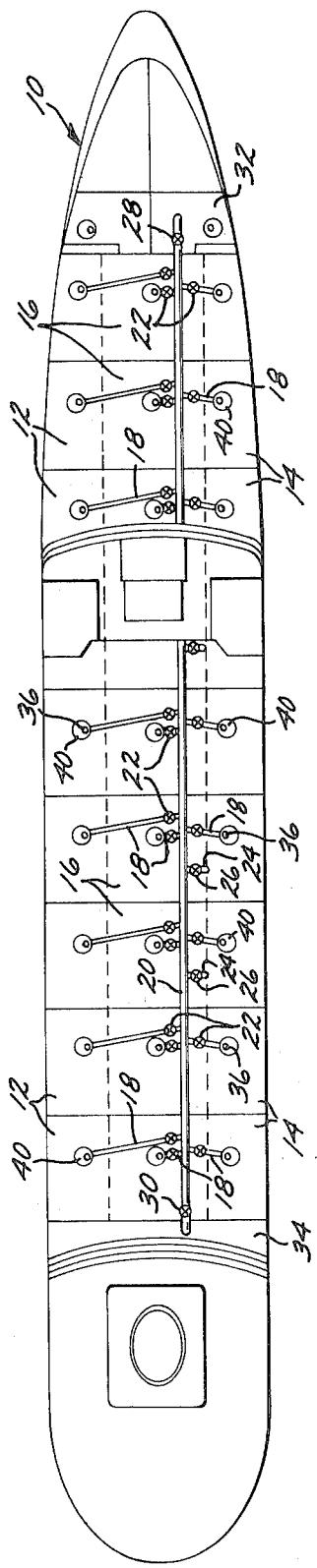
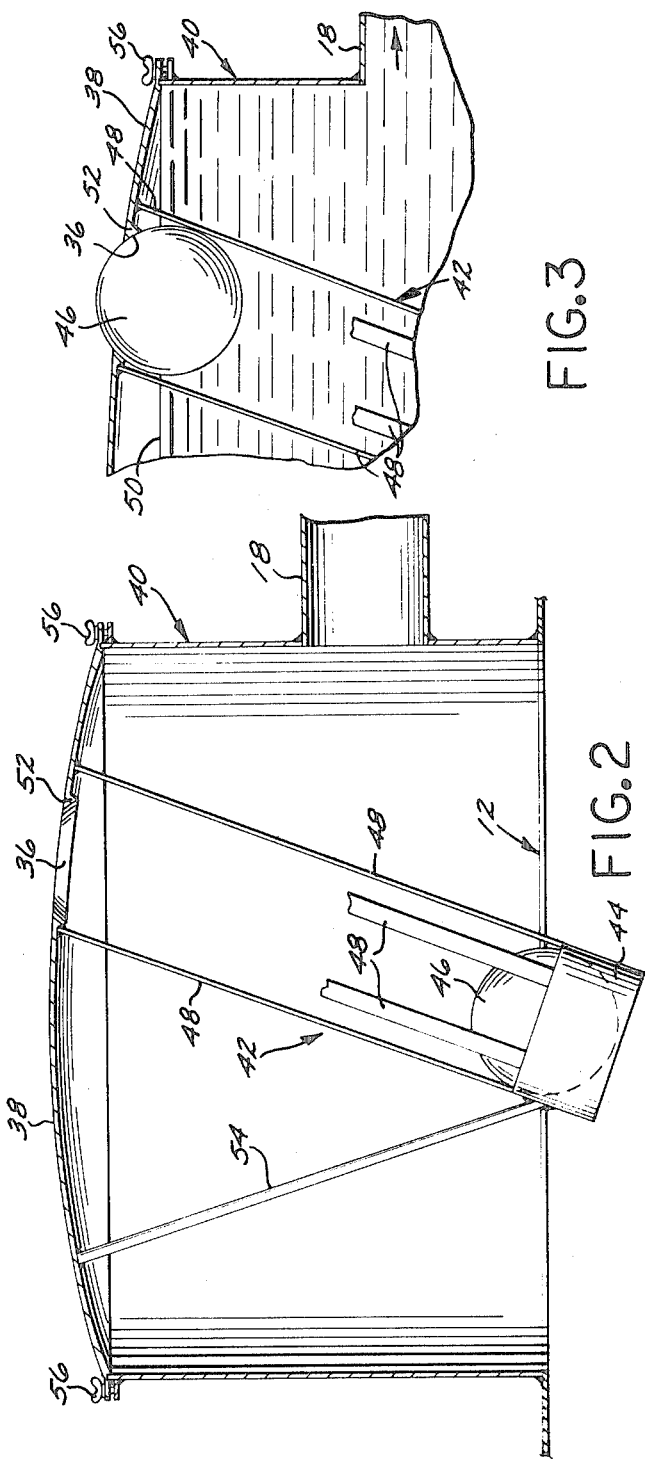
INVENTOR.
BRANKO MARIANI
BY Fulwider, Patton, Rieber,
Lee and Utecht
ATTORNEYS

ULLAGE OPENING SPILLAGE PREVENTION SYSTEM

BACKGROUND OF THE INVENTION

1. Field of the Invention

The present invention relates to an ullage opening spillage prevention system, and particularly to such a system for use in conjunction with the cargo tanks of a tanker or the like.

2. Description of the Prior Art

A conventional tanker is characterized by a plurality of cargo tanks having covers which each includes an ullage opening for determining the level of the liquid cargo in the tank. When the various cargo tanks are being filled it is customary for a crewman to monitor the tanks and operate the filling and valving system to prevent any of the tanks from overflowing. The tanks being filled are connected in parallel by a large filling conduit, with a valve at each of the tanks being operable to control the rate of flow of the liquid cargo into the particular tank.

When the crewman notes that a tank is just about filled, he closes the associated valve so that the liquid cargo in the main filling conduit then passes into the remaining unfilled tanks. Unfortunately, there are occasions when the crewman does not monitor the tanks closely enough and the first indication that the tank is filled occurs when the liquid cargo spills out of the ullage opening, over the deck and into the water adjacent the tanker. The filling rate is usually so high that a great many barrels of liquid cargo is spilled before the proper valves can be operated to stop the spilling. Such oil spills are expensive and time consuming to clean up, pollute the surrounding area, and present an extreme fire hazard.

SUMMARY

According to the present invention a system is provided to prevent spillage or overflow at the ullage openings of the cargo tanks of a tanker or the like. The system includes a float contained and buoyantly movable within an elongated, inclined guide located adjacent the ullage opening of each tank so that liquid cargo rising in the tank will buoy the float upwardly into sealing engagement with the ullage opening. The guide is characterized by an open framework so that a probing element can be inserted vertically downwardly through the open framework of the inclined guide to determine the character and level of the liquid cargo in the tank.

The present system preferably includes a plurality of lateral conduits connected to the cargo tanks and to a main conduit running fore and aft. The lateral conduits are available to carry away any overflow liquid when the float of a particular tank seals off the ullage opening. The overflow liquid passes from the particular lateral conduit into the main conduit, and then is discharged into an empty tank or other space made available for such an overflow.

Other objects and features of the invention will become apparent from consideration of the following description taken in connection with the accompanying drawings.

BRIEF DESCRIPTION OF THE DRAWING

FIG. 1 is a top plan view of a typical tanker embodying an ullage opening spillage prevention system according to the present invention;

FIG. 2 is a vertical cross-sectional view of the expansion trunk of one of the cargo tanks of the tanker of FIG. 1; and FIG. 3 is a partial showing of the expansion trunk of FIG. 2, but illustrating the sealing of the ullage opening on filling of the expansion trunk with liquid cargo.

DESCRIPTION OF THE PREFERRED EMBODIMENT

Referring now to the drawings, there is illustrated a liquid cargo carrying vessel or tanker 10 having a plurality of cargo tanks comprising wing tanks 12 and 14 on opposite sides of the tanker, and central tanks 16 located amidships. The tanks 12, 14, and 16 are each connected by a separate lateral conduit 18 to a main conduit 20 which runs fore and aft of the tanker 10. Preferably each conduit 18 includes a one-way or check valve 22 which allows liquid cargo, such a fuel oil for example, to flow from the associated tank into the main conduit 20, but does not allow the oil to flow from the conduit 20 into the tank. However, certain of the tanks, such as the two center tanks 16 shown in FIG. 1, are also provided with a conduit 24 connected to the main conduit 20 and including a drop valve 26. The drop valve may be opened, as will be seen, to allow fluid to flow from the main conduit 20 into the center tank 16 associated with the drop valve. Similar drop valves 28 and 30 are provided at the forward and rearward extremities of the main conduit 20 to enable dumping or discharge of oil from the main conduit 20 into a fore deep or forward space 32 and an after space 34.

The showing of certain center tanks 16 and spaces 32 and 34 to receive overflow oil is merely exemplary, and any available storage space may be used for this purpose. In addition, most of the conduits and piping found on the usual tanker are omitted for brevity and because they do not form a part of the present invention. In this regard, the various tanks are normally filled by pumping the liquid cargo through a filling conduit (not shown) which connects several of the tanks in parallel. The rate of filling of each tank is regulated by adjustment of a valve (not shown) associated with the particular tank. As previously indicated, a common practice in the prior art is to have a crewman monitor the filling of these tanks. This is usually done by inserting a dip stick or probing element (not shown) into an ullage hole or opening 36 provided in a circular cover which is removably fitted in sealing relation to the upper open end of a cylindrical expansion trunk 40. The trunk 40 forms an upward continuation of the associated cargo tank, and serves as a space into which the liquid cargo can expand, as would be the case on a hot day for example.

Should the crewman neglect to inspect the tank in time to determine that rising oil level in a cargo tank is close to the lower extremity of the expansion trunk, the oil will quickly fill the expansion trunk 40 and spill or overflow out of the ullage opening 38. By the time the crewman has an opportunity to close the valve (not shown) in the filling line, the overflowing oil will flood the deck and pollute the water about the tanker.

According to the present invention, the ullage opening 36 is automatically sealed against such overflow, as will be seen, so that even though the filling line valve remains open, the consequent pressurization in that tank causes the oil to flow into the next parallel-connected tank. However, rather than rely upon passage of the excess oil into the next tank to be filled, the present system preferably utilizes the lateral conduit 18 to carry the overflow oil into the main conduit and then, depending upon which of the drop valves 26, 28, or 30 has been opened, the overflow oil will pass into the overflow space associated with that drop valve.

The check valves 22 prevent any overflow oil from passing into a cargo tank which is to be or has already been filled with a different type of liquid cargo.

With particular reference to FIGS. 2 and 3, the means by which the ullage opening 36 is sealed upon the filling of the expansion trunk 40 with oil includes an elongated cage or guide 42 having a lower extremity which is closed by a cylindrical end portion 44 to support a spherical ball or float 46. The float 46 is preferably made of light material such as aluminum and is covered with a resilient layer of rubber or the like.

A plurality of elongated braces or guide elements 48 are welded at their lower ends to the end portion 44 in circumferentially spaced relation. The elements 48 extend upwardly as a continuation of the lower end portion 44 and are welded at their upper ends to the underside of the cover 38 and around the ullage opening 36. The number and arrangement of the guide elements 48 may vary as desired, but they should be so dimensioned and located that a relatively open framework is provided which is adapted to guide the float 46 in a generally upward path toward the opening 36 when the level of the oil 50 rises in the expansion trunk 40, as best seen in FIG. 3.

The ullage opening 36 itself is defined by an annular float seat 52 forming a part of the cover 38 and characterized by a contoured seat surface adapted to receive the curved surface of the spherical float 46 in close-fitting, sealing relation.

An ullage opening is normally provided in each cargo tank of a tanker and is normally utilized to visually inspect the interior of the tank or the tank expansion trunk, or to permit a dip stick or probing element (not shown) to be disposed vertically downwardly through the ullage opening into the interior of the cargo tank to determine how full it is, and perhaps to verify that the contents are gasoline, or fuel oil, or crude oil, etc. Because of the open framework of the guide 42, such a probe element can still be disposed into the tank through the present ullage opening 36, even though the guide 42 is present to afford a means for constraining the float 46 to move into sealing relation with the seat 52 whenever the oil 50 rises to the level shown in FIG. 3.

The guide 42 is secured in its inclined, off vertical orientation by one or more elongated struts or braces 54 secured to the cover 38 and to the lower end portion of the guide 42. With this arrangement, the cover 38 can be removed from the expansion trunk 40 by fastening a plurality of circumferentially arranged hatch dogs 56 and this will also effect removal of the guide 42 and float 46 which are carried by the cover 38.

The present system is not limited to any particular dimensions of conduits, guides, floats and the like, but dimensions of certain components of a typical system may be helpful. Thus, the main conduit 20 can be fabricated of 8 to 10-inch pipe, and the lateral conduits 18 fabricated of 8-inch pipe. The length of the guide 42 can be 3 feet with a diameter of approximately 1 foot. The diameter of the float 46 should be about an inch greater than the diameter of the ullage opening 36, and the resilient covering on the float 46 is preferably about one-half inch thick in order to provide a good resilient seat with the float seat 52.

In operation, the filling line (not shown) to the various tanks 12, 14, and 16 is opened to carry oil to the tanks, and the filling valves (not shown) at each tank is adjusted to provide the desired filling rate. Assuming that a particular tank becomes full to overflowing, and this fact escapes the inspection of the monitoring crewman, the rising oil level in the expansion trunk 40 causes the float 46 to move within the guide 42 into sealing engagement with the float seat 52. This prevents oil from spilling out of the ullage opening 36. Instead, the excess oil passes into the associated lateral conduit 18, from which it then passes to the main conduit 20. Depending upon which of the drop valves 26, 28 or 30 was previously opened, the overflowing oil from the main conduit 20 passes through that drop valve and is dumped or dropped into the associated storage space. In this regard, every tanker normally includes at least one tank which is kept empty. However, even if all of the usual cargo tanks are filled, the overflowing oil could be dumped into the storage spaces associated with either of the drop valves 28 and 30.

The system of lateral conduits 18 is also adapted to serve as the usual vent lines for venting the cargo tanks. In the event that the cargo tanks of the particular tanker with which this system is associated also include some additional venting lines, these lines will have to be either manually or automatically closed during the filling operation so that overflowing oil will not be able to spill out of such lines, but will be forced to flow into the system of lateral conduits 18.

The present overflow prevention system can be provided as the sole overflow prevention system on a tanker, or it can be provided as a backup system for another system, such as one of the electronic sensor systems, which sometimes malfunction.

From the foregoing it will be apparent that an ullage opening spillage prevention system is provided which automatically prevents contamination or pollution of harbors and the like when tanker filling operations are in progress.

Various modifications and changes may be made with regard to the foregoing detailed description without departing from the spirit of the invention.

I claim:

1. In a tanker characterized by a plurality of cargo tanks having covers which each includes an ullage opening for determining the level of liquid cargo in the tank, an ullage opening spillage prevention system comprising:
   a float;
   an elongated guide having a lower extremity normally supporting said float and an upper extremity opening to said ullage opening and secured to said cover, said guide having an inclined, open framework constraining said float to move along an inclined path toward said ullage opening upon being buoyed by liquid cargo rising in the tank, said inclined open framework enabling a probing element to be inserted vertically downwardly therethrough and into the cargo tank from said ullage opening; and
   means defining a float seat adjacent said ullage opening for receiving said float in sealing relation whereby spillage of rising liquid cargo through said ullage opening is prevented.

2. A spillage prevention system according to claim 1 wherein said float is spherical and said open framework is cylindrical in configuration.

3. A spillage prevention system according to claim 1 and including bracing means secured to said cover and to said lower extremity of said guide.

4. A spillage prevention system according to claim 1 wherein said cargo tanks include expansion trunks to which said covers are fitted; and wherein said system further comprises:
   a main conduit running fore and aft; and
   a plurality of lateral conduits connected to said main conduit and opening into said expansion trunks, respectively, whereby overflow from any one of said tanks passes into the associated one of said lateral conduits and then into said main conduit for discharge into an empty cargo space.

5. A spillage prevention system according to claim 4 and including a one-way check valve in each said lateral conduit whereby liquid cargo cannot pass from said main conduit into any one of said cargo tanks without deliberately bypassing the associated said check valve.

6. A spillage prevention system according to claim 4 and including drop valve means connected to said main conduit and to at least one of said cargo tanks, and operable to permit liquid to flow from said main conduit to said one of said cargo tanks.

* * * * *

UNITED STATES PATENT OFFICE
CERTIFICATE OF CORRECTION

Patent No. 3,628,559      Dated December 21, 1971

Inventor(s) BRANKO MARIANI

It is certified that error appears in the above-identified patent and that said Letters Patent are hereby corrected as shown below:

Change the name of the inventor from "Mariani Branko" to --- Branko Mariani ---.
Column 4, line 59, delete "to" (second occurrence) and insert --- into ---.

Signed and sealed this 13th day of June 1972.

(SEAL)
Attest:

EDWARD M. FLETCHER, JR.
Attesting Officer

ROBERT GOTTSCHALK
Commissioner of Patents